(12) United States Patent
Sosa González

(10) Patent No.: US 11,260,411 B2
(45) Date of Patent: Mar. 1, 2022

(54) AUTONOMOUS PAINTING ROBOT

(71) Applicant: SOSA GONZÁLEZ, S.L., Las Palmas de Gran Canaria (ES)

(72) Inventor: Carmelo Sosa González, Las Palmas de Gran Canaria (ES)

(73) Assignee: SOSA GONZÁLEZ, S.L., Las Palmas de Gran (ES)

( * ) Notice: Subject to any disclaimer, the term of this patent is extended or adjusted under 35 U.S.C. 154(b) by 83 days.

(21) Appl. No.: 16/830,486

(22) Filed: Mar. 26, 2020

(65) Prior Publication Data

US 2021/0252542 A1 Aug. 19, 2021

(30) Foreign Application Priority Data

Feb. 13, 2020 (ES) .............................. ES202030243U

(51) Int. Cl.
*B25J 5/00* (2006.01)
*B25J 11/00* (2006.01)
(Continued)

(52) U.S. Cl.
CPC .......... *B05B 13/005* (2013.01); *B05B 12/124* (2013.01); *B05B 13/00* (2013.01);
(Continued)

(58) Field of Classification Search
CPC ........ B05B 12/124; B05B 13/00; B25J 5/007; B25J 11/0075; B25J 15/0019; B25J 15/0066; B25J 19/02; B25J 19/023
See application file for complete search history.

(56) References Cited

U.S. PATENT DOCUMENTS 5,974,643 A * 11/1999 Hays ................... B23Q 17/2233
29/39
9,815,204 B2 * 11/2017 Hull ....................... B25J 9/1692
(Continued)

FOREIGN PATENT DOCUMENTS

CA 3030734 A1 * 11/2017 ............ B25J 15/022
CN 209222462 U 8/2019
(Continued)

OTHER PUBLICATIONS

United Kingdom Search and Exam Report for GB Application No. 2003449.2 dated Aug. 18, 2020, 3 pp.
(Continued)

*Primary Examiner* — Jermie E Cozart
(74) *Attorney, Agent, or Firm* — The Roy Gross Law Firm, LLC; Roy Gross

(57) ABSTRACT

The present utility model relates to an autonomous interior painting robot for homes, commercial premises, hotels, etc. The robot is designed for painting and outlining while recognizing obstacles in the work area and aimed at reducing the efforts and time needed to carry out these operations. It is applicable in the field of interior design and the completion of small conditioning works. The autonomous painting robot comprises a mobile base (1) equipped with a paint tank and a pump or compressor, characterized in that the base (1) comprises a series of detectors configured to locate the base (1) and to detect obstacles, a substantially vertical lifting column (4), at the end of which a robot arm (5) is articulated and topped with a head (6) that carries a paint gun (7) connected to the pump, one or more cameras (9), and a proximity sensor (10).

4 Claims, 2 Drawing Sheets

(51) Int. Cl.
   *B25J 15/00*   (2006.01)
   *B25J 19/02*   (2006.01)
   *B05B 12/12*   (2006.01)
   *B05B 13/00*   (2006.01)

(52) U.S. Cl.
   CPC .......... *B25J 5/007* (2013.01); *B25J 11/0075* (2013.01); *B25J 15/0019* (2013.01); *B25J 15/0066* (2013.01); *B25J 19/02* (2013.01); *B25J 19/023* (2013.01)

(56) References Cited

U.S. PATENT DOCUMENTS 10,124,359 B2 * 11/2018 Raman ................. B25J 11/0075
2019/0255551 A1    8/2019 Hargadon

FOREIGN PATENT DOCUMENTS

| CN | 111054553 A | 4/2020 | |
|---|---|---|---|
| EP | 0205175 A2 * | 12/1986 | ............ B25J 19/023 |
| WO | WO-2017171640 A1 * | 10/2017 | .......... B25J 11/0075 |

OTHER PUBLICATIONS

United Kingdom Search Report for GB Application No. 2003449.2 completed on Aug. 17, 2020, 1 pg.

\* cited by examiner

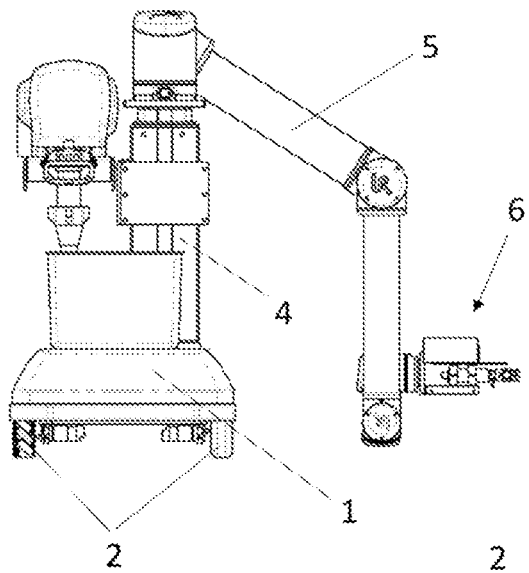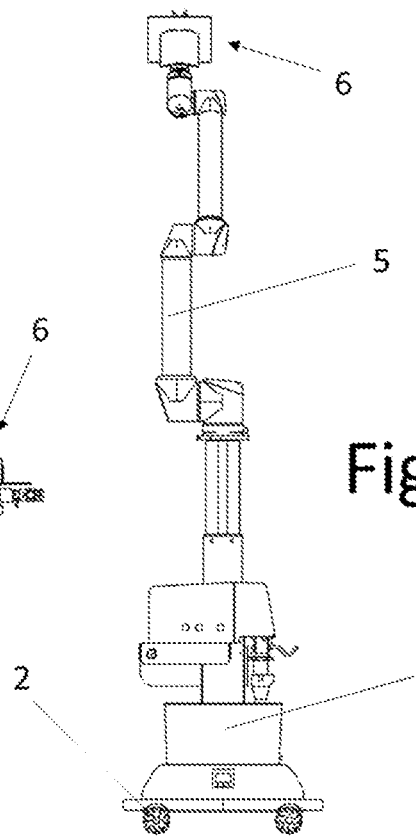

AUTONOMOUS PAINTING ROBOT

CROSS REFERENCE TO RELATED APPLICATIONS

This application is a U.S. Non-Provisional application, which claims the benefit of priority of Spanish Utility Application No. U202030243 filed on Feb. 13, 2020. The contents of the above applications are all incorporated by reference as if fully set forth herein in their entirety.

TECHNICAL FIELD

The present invention relates to an autonomous interior painting robot for homes, commercial premises, hotels, etc. It is a device designed for painting and outlining while recognizing obstacles in the work area, aimed at reducing the efforts and time needed to carry out these operations.

It is applicable in the field of interior design and the completion of small conditioning works.

STATE OF THE ART

Despite the latest technological advances in the field of construction and improvements in the area of maintenance, the subject of painting and interior restoration remains very artisanal. Therefore, it is a slow and expensive process, especially when it comes to large interior surfaces to be painted, such as: salons, large surfaces, hotels, etc.

The object of the present invention is a device for the painting, outlining and recognition of obstacles in the work area, aimed at reducing the efforts and time needed to carry out these operations.

Therefore, the personnel in charge of restoring tasks in large areas must make significant efforts to paint high ceilings and hard-to-reach corners. In addition, the positions needed to reach ceilings or corners are often incorrect or exhausting and must be covered with paint in several stages for occupational health reasons.

The applicant does not know of other devices similar to that of the invention.

BRIEF EXPLANATION OF THE INVENTION

The invention relates to an autonomous painting robot, according to the claims, whose embodiments solve the problems of the prior art.

The robot arm base assembly is an autonomous device that allows painting all surfaces from a minimum level, at ground level, up to a ceiling that can be 3 meters or more depending on its dimensions.

The autonomous painting robot comprises a mobile base with a paint tank and a pump or compressor. The base comprises a series of detectors configured to locate and detect obstacles. A substantially vertical lifting column comes up from the base, at the end of which an articulated robot arm is arranged and topped with a head. This head carries a paint gun connected to the pump, for example of the "airless" type, one or more cameras, and a proximity sensor. Preferably, it also carries a retractable spatula.

In a preferred embodiment, the base comprises omnidirectional wheels.

The head cameras may each comprise light sources.

Other variants will be described later.

DESCRIPTION OF THE DRAWINGS

For a better understanding of the invention, the following figures are included.

FIG. 1: front view of an embodiment of the device, with the robot arm folded.

FIG. 2: side view of the previous exemplary embodiment, with the robot arm deployed.

EMBODIMENTS OF THE INVENTION

Figure 3:
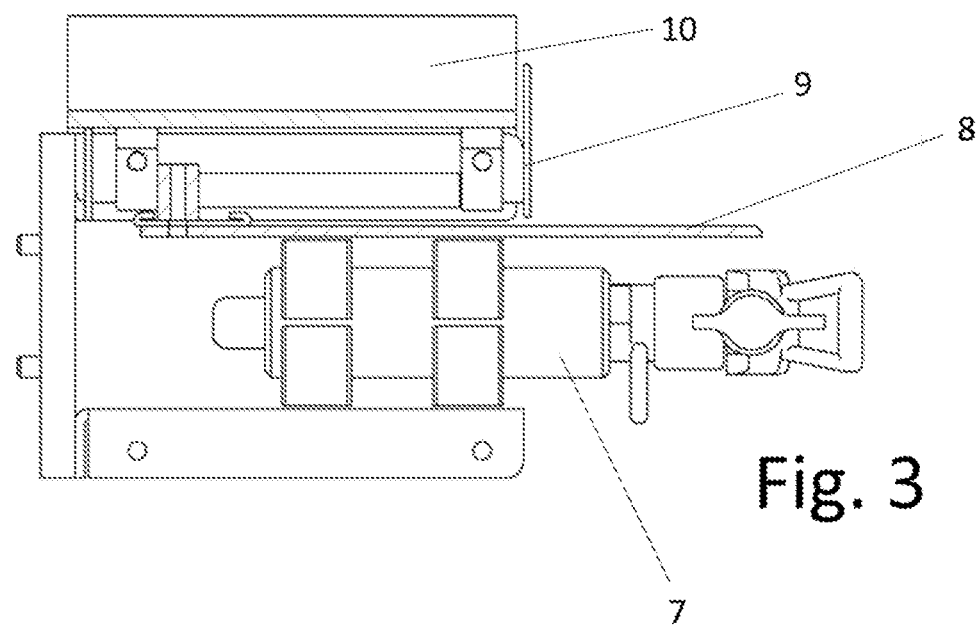
FIG. 3: detail of an example of a head.

Next, an embodiment of the invention will be briefly described as an illustrative and non-limiting example thereof.

The robot shown in the embodiments of the figures comprises a mobile base (1), for example comprising four omnidirectional wheels (2), of the "mechanum wheel" type. These wheels (2) allow movement in any direction to allow getting closer to the area to be painted. It also includes a series of laser, visual detectors to locate and detect obstacles. For example, it is equipped with infrared detectors around the base (1) to detect and avoid obstacles and room boundaries.

The base (1) supports a lifting column (4), for example, telescopic, which is arranged in a substantially vertical direction. A robot arm (5), articulated and topped with a head (6) that carries a paint gun (7), is provided at the top of the lifting column (4). The gun (7) is preferably of the "airless" type to reduce possible stains.

The head (6) also carries a retractable spatula (8). It is intended to outline ceilings, window frames and baseboards.

One or more cameras (9) in the head (6), ideally each with light sources, and a proximity sensor (10) allow to recognize the surfaces to be painted and outlined. A color detector allows to recognize whether the passage of the gun (7) was sufficient or it is necessary to retouch. The color detector may operate independently or by programming from the images of the cameras (9).

The base (1) comprises a paint tank and a pump or compressor to bring it up to the gun (7) through a suitable tube, attached to the robot arm (5). The tank is removable to facilitate the change of paint, its cleaning and that of the pump or compressor.

All of the above elements are powered by one or more batteries, by a wiring connected to the network, or by both solutions.

The invention claimed is:

1. An autonomous painting robot comprising:
   a mobile base equipped with a paint tank and a pump or compressor, the base (1) comprising
      a series of detectors configured to locate the base and to detect obstacles,
      a substantially vertical lifting column, at the end of which a robot arm is articulated and topped with a head that carries a paint gun connected to the pump,
      one or more cameras, and
      a proximity sensor,
   wherein the head carries a retractable spatula.

2. The robot of claim 1, wherein the base further comprises omnidirectional wheels.

3. The robot of claim 1, wherein the paint gun is of the "airless" type.

4. The robot of claim 1, wherein the one or more cameras each comprises lighting sources.

* * * * *